United States Patent
Roden et al.

(10) Patent No.: US 9,286,079 B1
(45) Date of Patent: Mar. 15, 2016

(54) CACHE OPTIMIZATION OF A DATA STORAGE DEVICE BASED ON PROGRESS OF BOOT COMMANDS

(75) Inventors: Thomas A. Roden, Irvine, CA (US); Robert M. Fallone, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 874 days.

(21) Appl. No.: 13/174,760

(22) Filed: Jun. 30, 2011

(51) Int. Cl.
*G06F 9/44* (2006.01)
*G06F 15/177* (2006.01)
*G06F 12/08* (2006.01)
*G06F 11/10* (2006.01)
*G06F 11/30* (2006.01)

(52) U.S. Cl.
CPC .......... *G06F 9/4401* (2013.01); *G06F 11/1076* (2013.01); *G06F 11/3055* (2013.01); *G06F 12/0804* (2013.01); *G06F 12/0866* (2013.01); *G06F 15/177* (2013.01)

(58) Field of Classification Search
CPC . G06F 9/4401; G06F 15/177; G06F 12/0804; G06F 12/0866; G06F 11/1076; G06F 11/3055
USPC ........................................................... 713/2
See application file for complete search history.

(56) References Cited

U.S. PATENT DOCUMENTS

| | | |
|---|---|---|
| 5,155,833 A | 10/1992 | Cullison et al. |
| 5,269,019 A | 12/1993 | Peterson et al. |
| 5,269,022 A | 12/1993 | Shinjo et al. |
| 5,307,497 A | 4/1994 | Feigenbaum et al. |
| 5,448,719 A | 9/1995 | Schultz et al. |
| 5,581,785 A | 12/1996 | Nakamura et al. |
| 5,636,355 A | 6/1997 | Ramakrishnan et al. |
| 5,713,024 A | 1/1998 | Halladay |
| 5,724,501 A | 3/1998 | Dewey et al. |
| 5,812,883 A | 9/1998 | Rao |
| 5,832,005 A | 11/1998 | Singh |
| 5,966,732 A | 10/1999 | Assaf |
| 5,978,922 A | 11/1999 | Arai et al. |
| 6,073,232 A | 6/2000 | Kroeker et al. |
| 6,098,158 A | 8/2000 | Lay et al. |
| 6,101,574 A | 8/2000 | Kumasawa et al. |
| 6,209,088 B1 | 3/2001 | Reneris |

(Continued)

FOREIGN PATENT DOCUMENTS

JP  06-110786 A  4/1994

OTHER PUBLICATIONS

Office Action dated Jun. 27, 2005 from U.S. Appl. No. 10/185,880, 17 pages.

*Primary Examiner* — Jaweed A Abbaszadeh
*Assistant Examiner* — Terrell Johnson

(57) ABSTRACT

The present invention relates to optimizing the performance of a data storage device, such as a hard data storage device, during boot operations and normal operations. In particular, during power up, the data storage device monitors the nature and progress of commands issued from a host. During boot operations, the data storage device sets its cache to a boot mode. The boot mode is designed to speed the boot process and aggressively cache data used during boot up of the data storage device and the host. The data storage device detects the transition of the host operations from boot operations to normal operations based on various criteria. The caching mode of the data storage device is then changed for normal operations based on the transition.

22 Claims, 7 Drawing Sheets

(56) References Cited

U.S. PATENT DOCUMENTS

| | | | |
|---|---|---|---|
| 6,226,740 B1 * | 5/2001 | Iga | 713/2 |
| 6,286,108 B1 | 9/2001 | Kamo et al. | |
| 6,434,696 B1 | 8/2002 | Kang | |
| 6,449,683 B1 | 9/2002 | Silvester | |
| 6,539,456 B2 | 3/2003 | Stewart | |
| 6,662,267 B2 | 12/2003 | Stewart | |
| 6,745,283 B1 | 6/2004 | Dang | |
| 6,807,630 B2 | 10/2004 | Lay et al. | |
| 6,901,477 B2 * | 5/2005 | Sullivan | 711/113 |
| 6,904,496 B2 | 6/2005 | Raves et al. | |
| 6,968,450 B1 | 11/2005 | Rothberg et al. | |
| 6,993,649 B2 | 1/2006 | Hensley | |
| 7,099,993 B2 | 8/2006 | Keeler | |
| 7,107,444 B2 | 9/2006 | Fortin et al. | |
| 7,130,962 B2 | 10/2006 | Garney | |
| 7,181,608 B2 | 2/2007 | Fallon et al. | |
| 7,461,202 B2 | 12/2008 | Forrer, Jr. et al. | |
| 7,464,250 B2 | 12/2008 | Dayan et al. | |
| 7,669,044 B2 | 2/2010 | Fitzgerald et al. | |
| 7,900,037 B1 | 3/2011 | Fallone et al. | |
| 8,082,433 B1 | 12/2011 | Fallone et al. | |
| 2001/0039612 A1 | 11/2001 | Lee | |
| 2002/0069354 A1 * | 6/2002 | Fallon et al. | 713/2 |
| 2002/0156970 A1 | 10/2002 | Stewart | |
| 2003/0005223 A1 * | 1/2003 | Coulson et al. | 711/118 |
| 2003/0135729 A1 | 7/2003 | Mason, Jr. et al. | |
| 2003/0142561 A1 | 7/2003 | Mason, Jr. et al. | |
| 2003/0212857 A1 | 11/2003 | Pacheco et al. | |
| 2004/0003223 A1 | 1/2004 | Fortin et al. | |
| 2004/0064647 A1 | 4/2004 | DeWhitt et al. | |
| 2006/0294352 A1 | 12/2006 | Morrison et al. | |
| 2007/0005883 A1 | 1/2007 | Trika | |
| 2007/0038850 A1 * | 2/2007 | Matthews et al. | 713/1 |
| 2007/0083743 A1 | 4/2007 | Tsang | |
| 2007/0083746 A1 | 4/2007 | Fallon et al. | |
| 2008/0147985 A1 * | 6/2008 | Astigarraga et al. | 711/135 |
| 2008/0209198 A1 | 8/2008 | Majni et al. | |
| 2010/0070747 A1 * | 3/2010 | Iyigun et al. | 713/2 |
| 2010/0077194 A1 * | 3/2010 | Zhao et al. | 713/2 |
| 2010/0077197 A1 * | 3/2010 | Ergan et al. | 713/2 |
| 2011/0010502 A1 * | 1/2011 | Wang et al. | 711/128 |
| 2012/0066447 A1 * | 3/2012 | Colgrove et al. | 711/114 |

* cited by examiner

CACHE OPTIMIZATION OF A DATA STORAGE DEVICE BASED ON PROGRESS OF BOOT COMMANDS

BACKGROUND

One significant measure of mass storage device performance is the speed with which the computing system becomes responsive to user input. This is highly dependent upon the time it takes to perform the initial load of the Operating System (OS), which may be a cold-boot or a resume from hibernation. Current approaches to optimizing this performance focus on the time elapsed from power on or the first time the media is accessed. Such approaches are dependent upon the execution speed and device initialization sequence of the Basic Input Output Services (BIOS) and the OS.

An approach that uses additional information available to an attached mass storage device would provide a higher-confidence determination of the transition from OS loading, which tends to be repetitive, to the OS operational state, which is less predictable. Accordingly, an optimization approach, such as caching or predictive loading, would benefit from the knowledge of the phase of initialization in force at the time of a block access.

BRIEF DESCRIPTION OF THE DRAWINGS

Systems and methods which embody the various features of the invention will now be described with reference to the following drawings, in which.

DETAILED DESCRIPTION

Certain configuration operations and data transfer modes applied to a mass storage device strongly imply the transition from initial load to operation. Detection of these operations could be used to improve boot performance of mass storage devices with much less sensitivity to the speed and sequential optimization of the host. In a normal hard drive, reads and writes related to booting or resumption from hibernation are treated equally to reads and writes issued during normal operation. Configuration operations, such as enabling the read or write capabilities of the cache may indirectly affect hard drive behavior, but these configuration operations are blindly honored without any attempt to modify behavior based on the perceived boot-mode of the drive.

The present invention is directed to systems and methods for a data storage device, such as a hard drive, to optimize its transition from boot to normal operations. Operations that occur soon after power-on are identified as being useful for boot and their blocks are marked or segregated to allow them to be accessed more quickly in subsequent boots. The boot transition detection of the embodiments may employ additional methods, such as the monitoring of specific configuration commands and increases in the command queue depth, to determine when accessed sectors are to be marked, segregated and/or cached.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
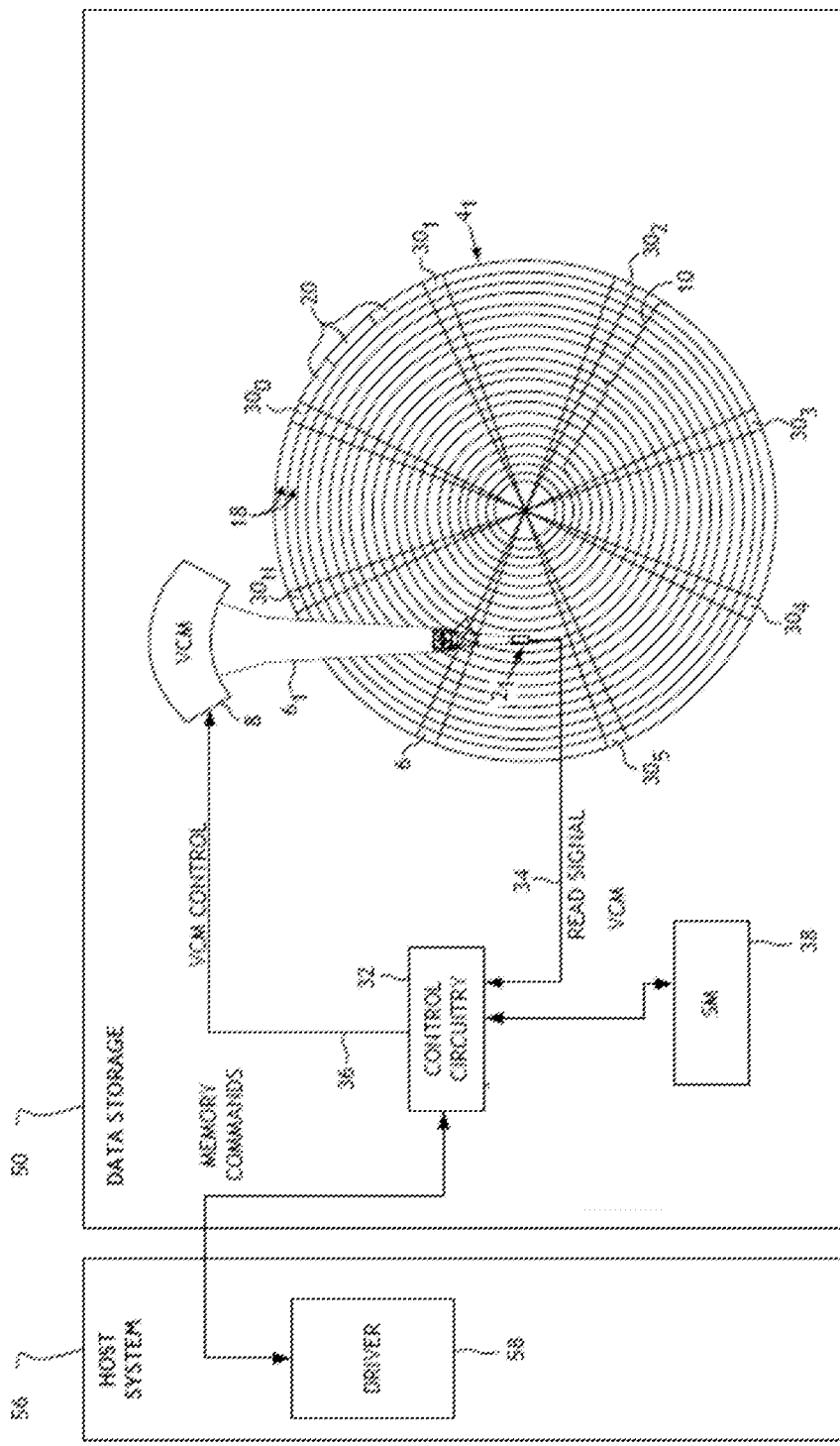
FIG. 1 is a block diagram illustrating a bootable data storage device according to one embodiment.

FIG. 1 shows a disk-drive based data storage device 50 according to one embodiment. The data storage device 50 includes a head $2_1$ actuated radially over a disk surface $4_1$ by an actuator arm $6_1$, and a voice coil motor (VCM) 8 operable to rotate the actuator arm $6_1$ about a pivot. The disk surface 4, such as $4_1$, comprises a host addressable area 10 with a plurality of data tracks 18, wherein each data track 18 comprises a plurality of data blocks 20.

In the embodiment in FIG. 1, the disk surface $4_1$ further comprises a plurality of embedded servo sectors $30_1$-$30_N$ that define the data tracks 18 in the host addressable area 10. The data storage device 50 further comprises control circuitry 32, which is operable to process a read signal 34 emanating from the head 21 to demodulate the embedded servo sectors $30_1$-$30_N$ and generate a position error signal (PES). The PES represents a radial offset of the head 21 from a target data track 18 in the host addressable area 10. The control circuitry 32 is further operable to process the PES with a suitable servo compensator to generate a VCM control signal 36 applied to the VCM 8. The VCM 8 rotates the actuator arm 61 about a pivot in order to actuate the head 21 radially over the disk surface $4_1$ in a direction that decreases the PES. The control circuitry 32 is also configured to receive commands from a driver 58 in the host system 56.

In one embodiment, the data storage device 50 further comprises a buffer in a memory, such as a semiconductor memory (SM) 38 communicatively coupled to the control circuitry 32. The SM 38 may serve as a cache for temporarily storing write data received from the host 56 via a write command and read data requested by the host 56 via a read command. The SM 38 can be implemented, for example, using dynamic random access memory (DRAM), flash memory, or static random access memory (SRAM).

In some embodiments, the data storage device 50 may employ SM 38 as a boot cache for boot operations, an operational cache for normal operations, and a shared cache when the SM 38 comprises a non-volatile memory for caching. When caching for boot, new boot cache entries may evict operational cache entries from the shared cache if necessary. Thus, the maximum size of the boot cache is boot cache exclusive size plus the shared cache size. The maximum size of the operational cache is operational cache exclusive plus shared cache size. During boot, operational cache entries will not evict boot cache entries from the shared cache. However, during aggressive caching mode, boot cache entries may evict operational cache entries from the shared cache. In some embodiments, the aggressive caching mode for boot commands is active only during boot.

In other embodiments, the cache for boot commands and operational commands in SM 38 is implemented on a volatile memory. Accordingly, in these embodiments, during boot, the boot cache portion is allocated more space than the portion for normal operational commands. During normal operations, the boot cache may be de-allocated or its size drastically reduced. In some instances, some boot entries may be evicted in favor of operational entries, for example, to allow for spin-down of the data storage device 50.

Figure 2:
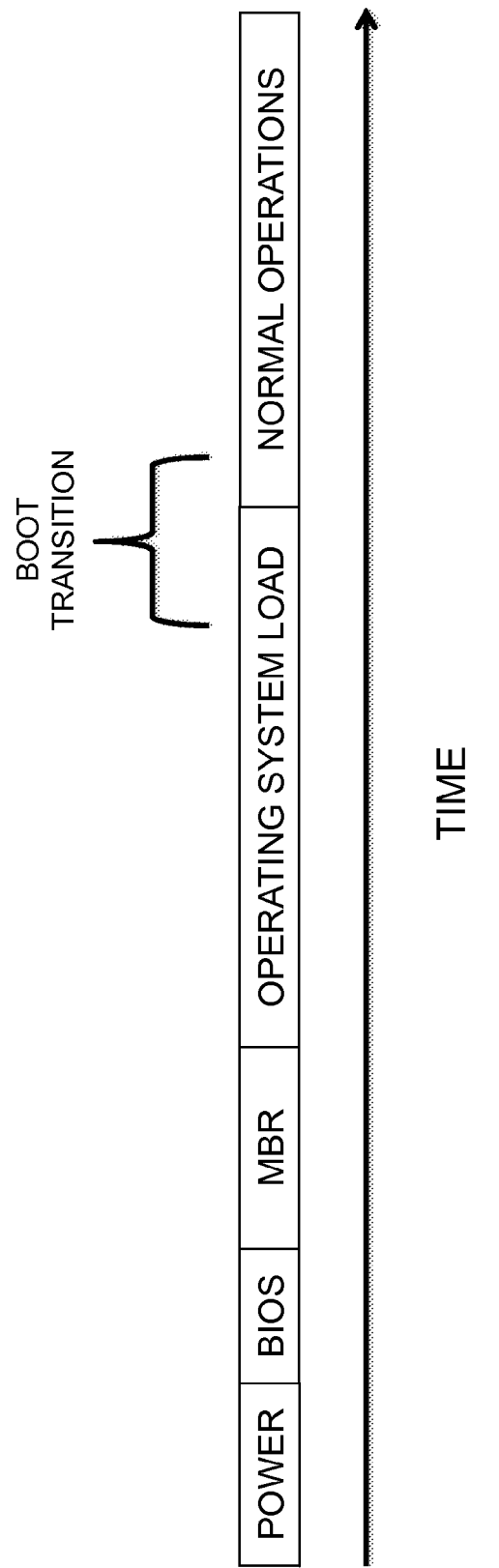
FIG. 2 illustrates an exemplary boot sequence of a host using the data storage device as a bootable device.

FIG. 2 shows a simplified sequence for boot that may be executed by the host 56. As shown, the host 56 initially powers on, and thus, the processor (not shown) of the host 56 may commence running. Upon starting, the processor of the host 56 runs an instruction that transfers execution to the location of the BIOS start-up program. The BIOS start-up program typically runs a power-on self-test to check and initialize required devices, such as communications interfaces, various peripherals, etc. For example, the BIOS goes through a pre-configured list of non-volatile storage devices, such as data storage device 50, until it finds one that is bootable.

Once the BIOS has found that the data storage device 50 is a bootable device, host 56 commences loading the operating system. For example, from data storage device 50, the host 56 loads program code from the boot sector and transfers execution to the boot code. For example, the data storage device 50 may comprise a master boot record (MBR, not shown) on disk surface 4 at a predetermined location. The MBR code instructs the host 56 to check the partition table of the data storage device 50 for a bootable partition and loads the boot sector code from that partition and executes it.

The code in the boot sector may vary depending on the operating system. However, generally, the code in the boot sector loads and executes the operating system kernel.

The embodiments may be implemented on any interface such as SATA, SAS, SCSI, and the like. Many of the commands and states have similar analogs on these and other interfaces, which are considered within the scope of the embodiments. In addition, the embodiments may be applied to any operating system, such as Windows, Mac OS, LINUX, UNIX, etc. For example, in one embodiment, there are a number of ATA/ATAPI Command Set-2 (ACS-2) commands that indicate stages in the evolution from boot to operation. In the boot phase, certain commands are identified as indicating a transition from boot to normal operations. During boot, many features are not yet configured both to allow later configuration and to increase the likelihood of successful command completion. However, the configuration of these features and the locking-in of configurations indicate progression to the operational state. In the embodiments, the following commands may be considered relevant indicators of this progression:

SECURITY FREEZE LOCK:—This command prevents the modification of security features until a power-off or hardware reset occurs. For a system using security, this is a strong indication that all relevant passwords and security features have been set. This, in turn, is a strong indication that OS initialization is well under way, if not complete. If used, this command must follow all security-related configurations, and should occur before any user or application program can change the security state.

SET_FEATURES—Disable reverting to power-on defaults: This command prevents previously set features from changing state in response to a soft reset. This command is a strong indicator that feature configuration is complete, something much more likely to be done by the OS than by the BIOS, and probably occurring near the end of OS load. Issuing this command early would complicate the attempts of OS architects to modify the initialization order of the OS boot.

SET_FEATURES—Enable volatile write cache: This command enables the volatile write cache, which is off by default. Unsophisticated software, such as the BIOS and the early boot loaders of operating systems, favor safety over speed. Keeping this cache off increases the likelihood of successful recovery after an unsuccessful boot. Furthermore, booting involves much more reading than writing, so the benefits of the write cache are limited. Once the OS is sufficiently booted and configured, it will enable the write cache to take advantage of the improved operational performance.

Of course, the commands described above are provided as non-limiting examples of commands that may indicate a boot transition. Other commands, such as CACHE_FLUSH, alone or in combination, may indicate a boot transition.

In addition, the following mode change may be considered relevant indicators of boot progression:

Command Queue Depth—Increasing above depth of one: Because BIOS load is single-threaded and straightforward, it does not attempt to use command queuing to increase performance. Modern operating systems, however, do employ command queuing for performance and to allow multiple threads and processes to avoid unnecessary blockage due to disk operation serialization.

By tracking the occurrence of the aforementioned commands, the progress of the boot can be inferred, and the desirability to cache accessed blocks can be refined. A scoreboard or other state machine could be employed to enhance confidence in a partial-response maximum-likelihood fashion.

In some embodiments, the control circuitry 32 monitors and logs the boot commands of the host 56. The control circuitry 32 may store this history of boot commands in SM 38, for example, if SM 38 comprises a non-volatile memory, such as a flash memory. Alternatively, the control circuitry 32 may store the boot command sequence logs in a predetermined location on disk surface 4. The control circuitry 32 may store the commands as well as the data associated with the commands. In addition, the control circuitry 32 may store various numbers of historical boots of various lengths and associated data.

From the historical boot data, the control circuitry 32 may thus predict the progression of the boot sequence of the host 56. As will be further described below, the control circuitry 32 may determine one or more triggers that indicate a boot transition to normal operations. The triggers may be configured, for example, by a setting or by an administrator input. Alternatively, the triggers may be determined dynamically based on an analysis of the history. For example, the most frequent boot commands received within a certain time period of normal operations may be identified by the control circuitry 32 as possible candidates for triggers. Therefore, on the next boot sequence, the control circuitry 32 may utilize these triggers in optimizing its caching behavior and operations.

FIGS. 3-7 illustrate exemplary process flows in accordance with one embodiment. The control circuitry 32 may be configured to perform these methods based on program code that has been loaded into SM 38 from another memory, such as a flash memory, or from a predetermined location or sector on the disk surface 4.

Figure 3:
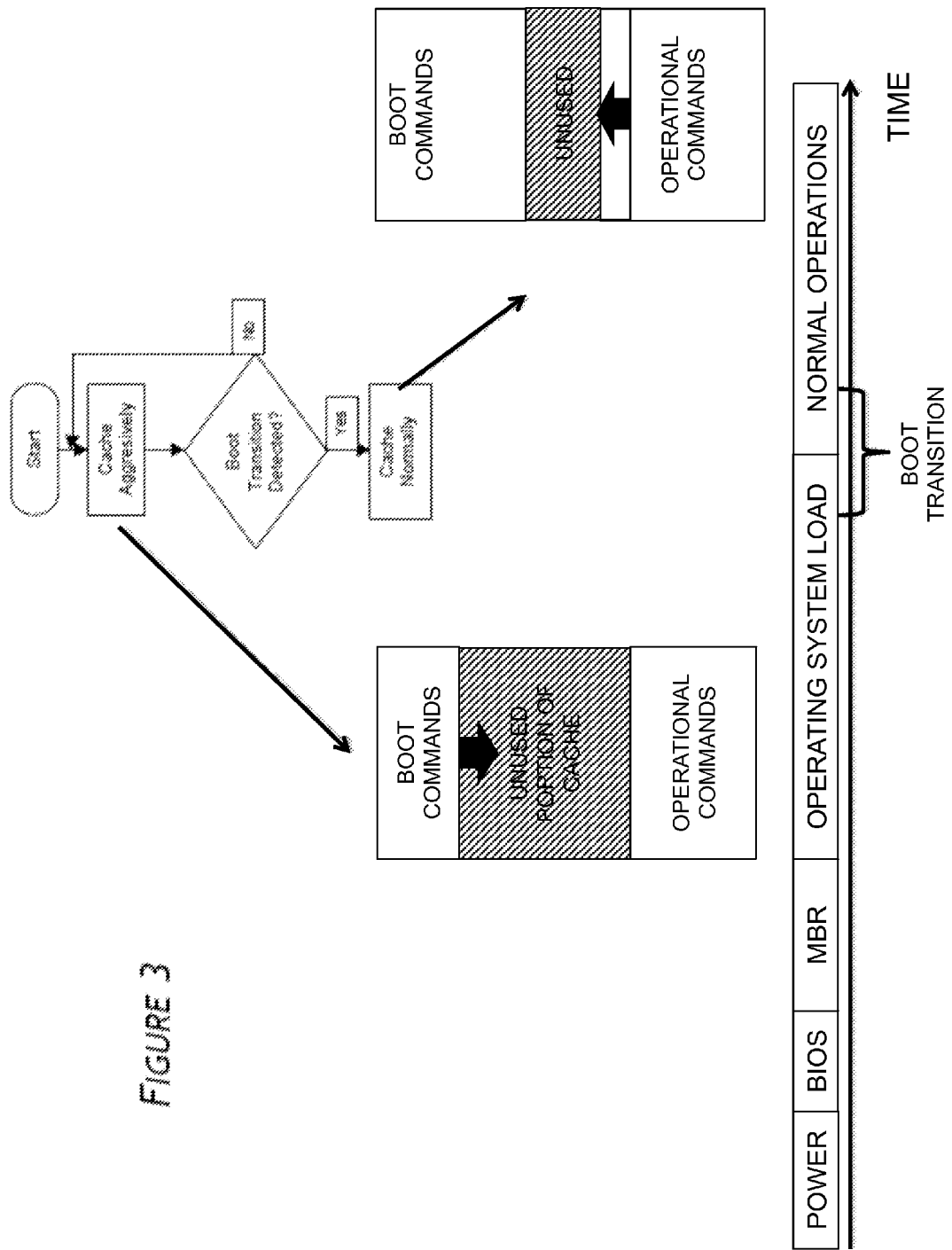
FIG. 3 illustrates a flow diagram illustrating an exemplary process and a transition in caching modes in accordance with an embodiment.
Figure 4:
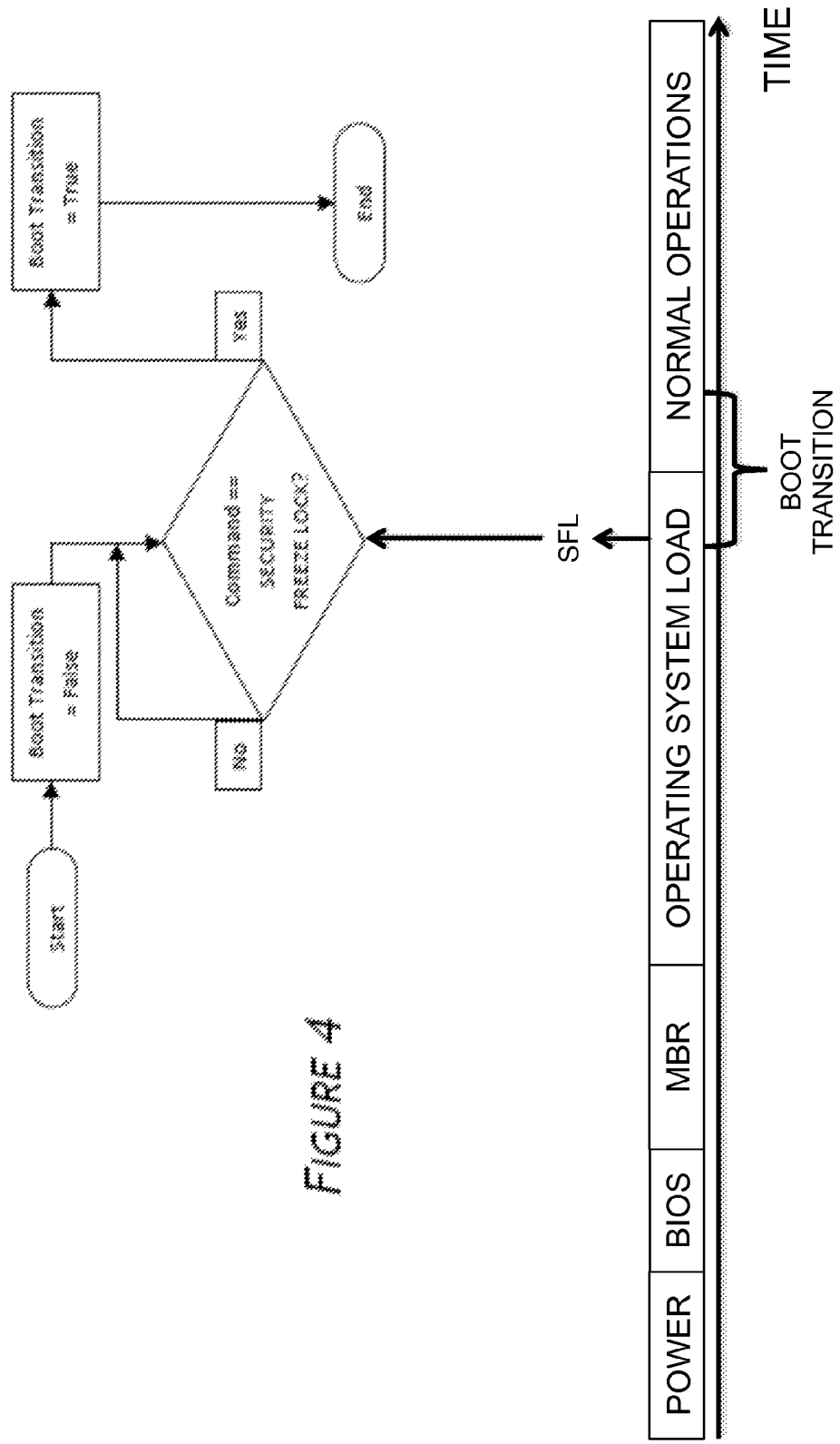
FIG. 4 illustrates a flow diagram illustrating an exemplary process for detecting a boot transition based on identifying a boot command in accordance with an embodiment.
Figure 5:
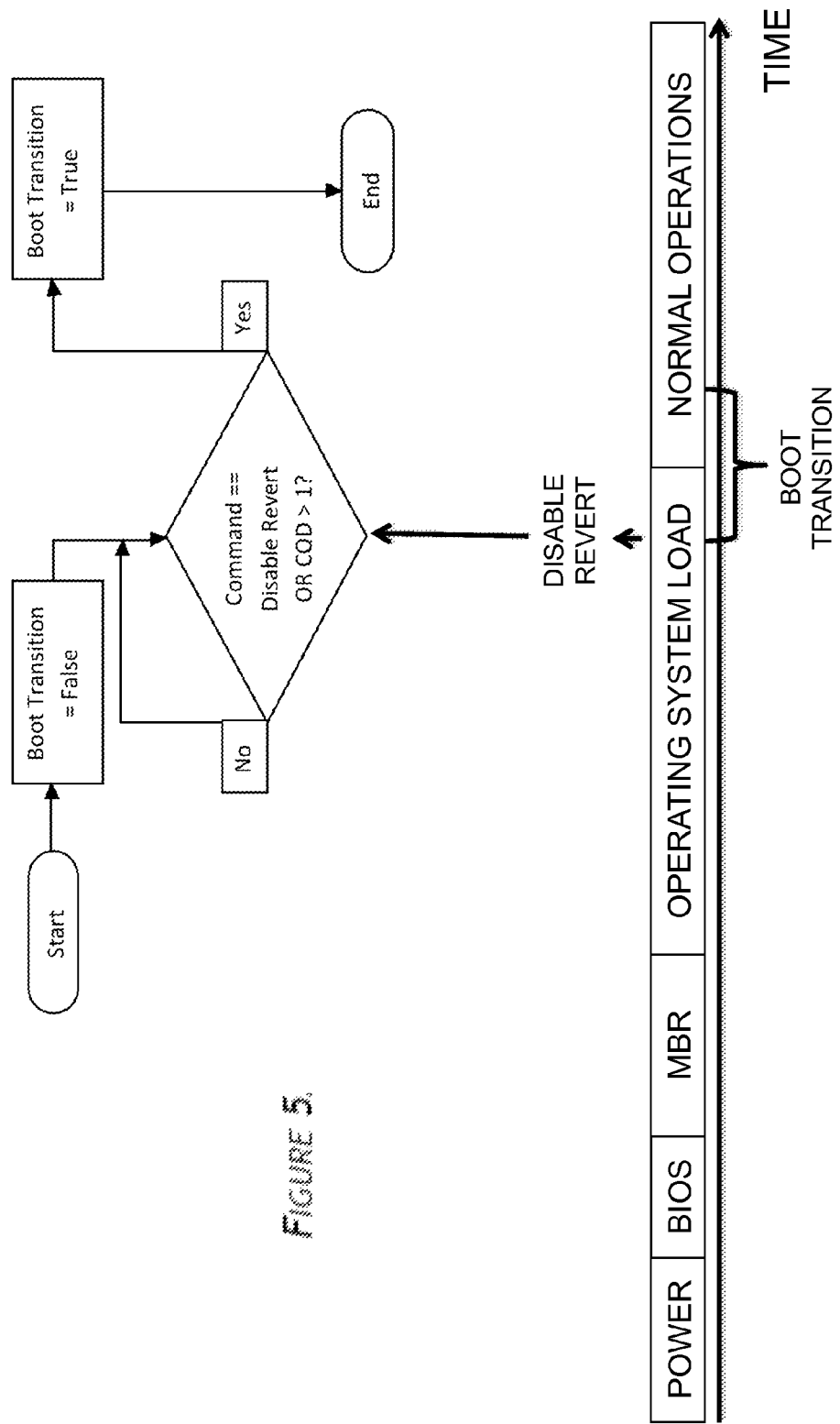
FIG. 5 illustrates a flow diagram illustrating an exemplary process for detecting a boot transition based on identifying a boot command or a command queue depth (CQD) in accordance with an embodiment.
Figure 6:
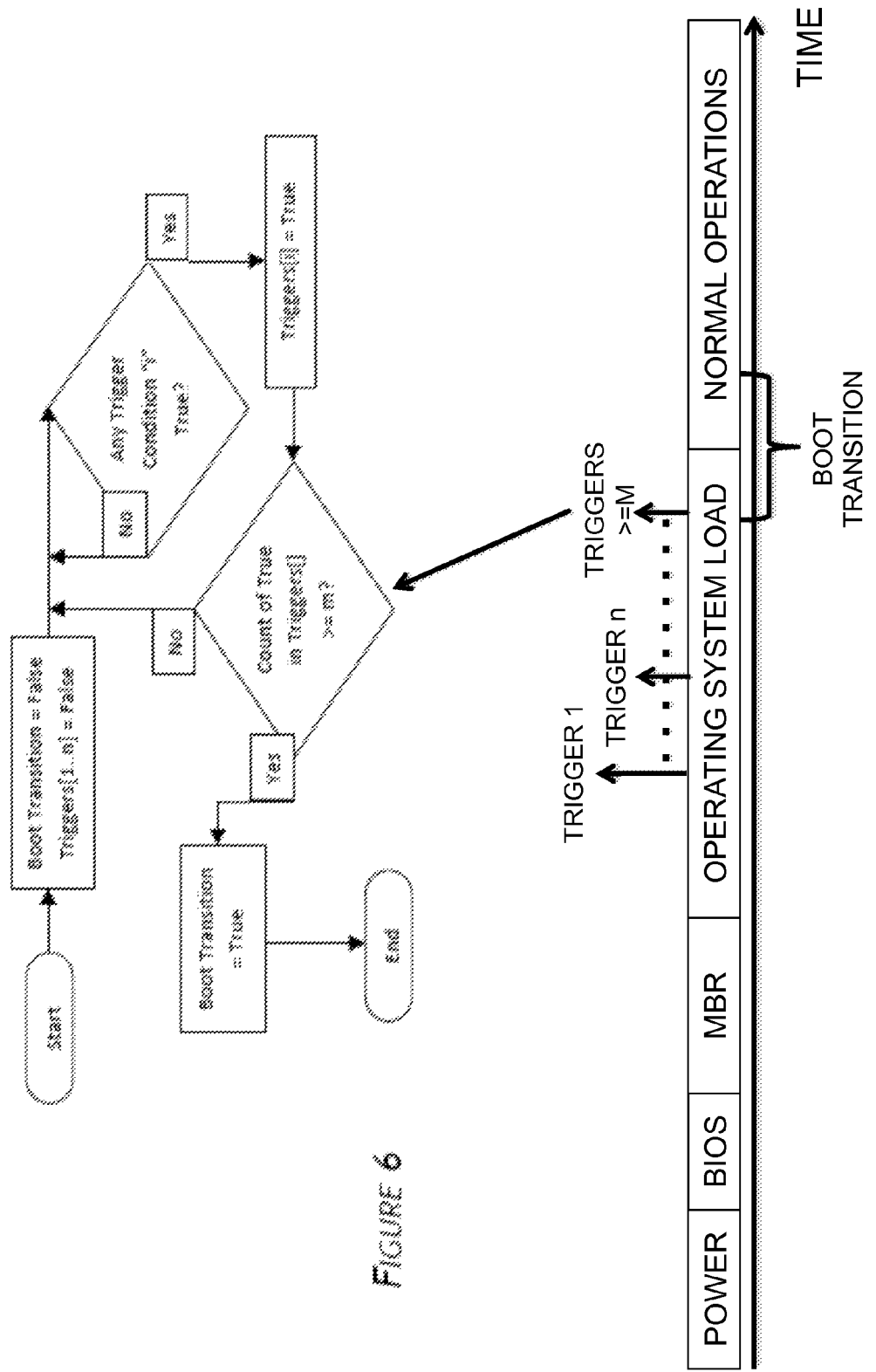
FIG. 6 illustrates a flow diagram illustrating an exemplary process for boot transition based on identifying a plurality of triggers in accordance with an embodiment.
Figure 7:
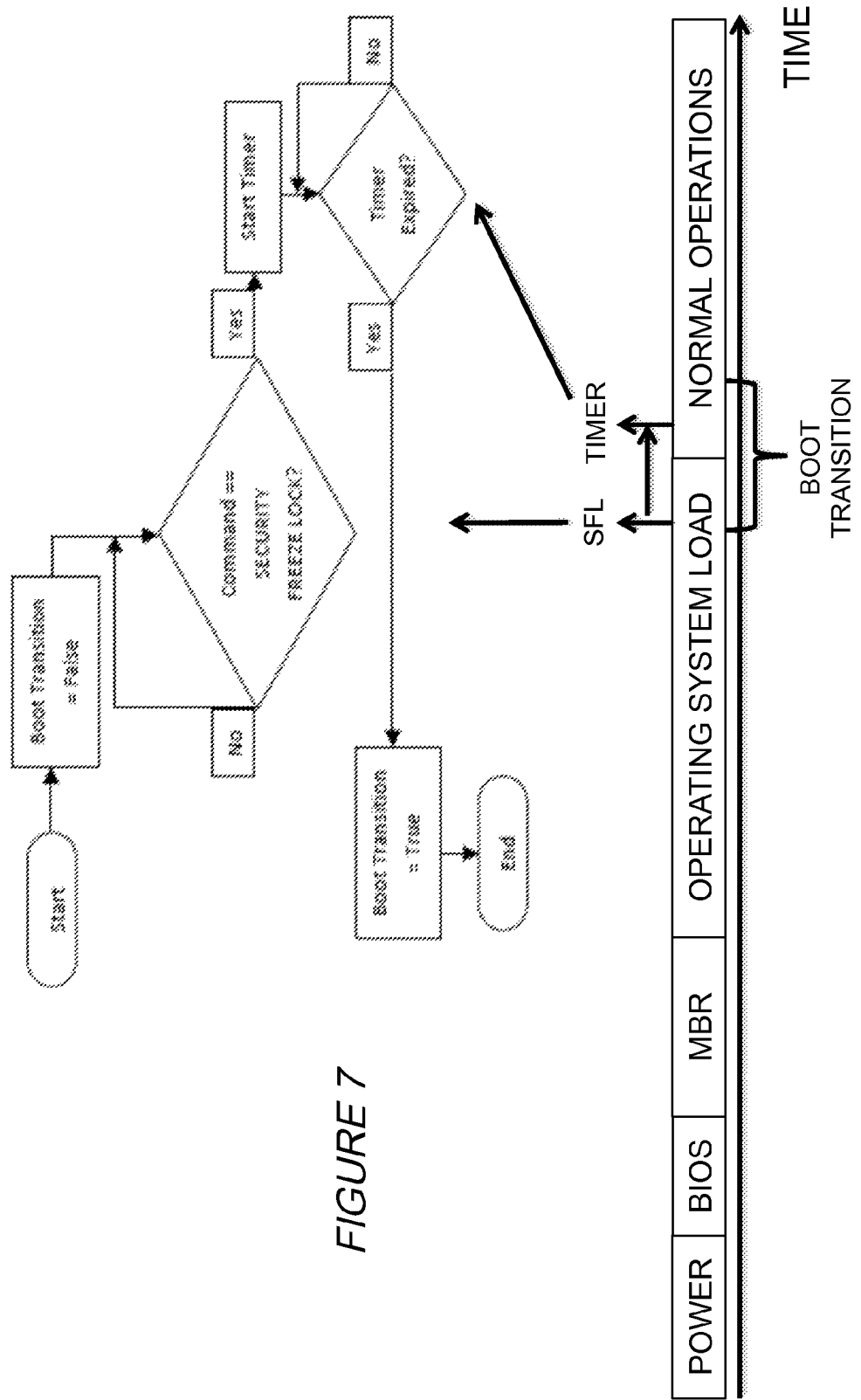
FIG. 7 illustrates a flow diagram illustrating an exemplary process for boot transition based on identifying a trigger and then passage of a certain time delay in accordance with an embodiment.

In one embodiment, as shown in FIGS. 3 and 4, an aggressive form of detection would be to use the first trigger encountered as positive assertion that the operating system is transitioning from boot. Alternatively, a more conservative approach as shown in FIGS. 5 and 6 would be to wait for a second unique trigger to occur before determining the transition had occurred. In yet another embodiment, an even more conservative approach as shown in FIG. 7 may involve intervening time or commands between the two triggers, for example, to wait for two more closely spaced triggers.

To increase robustness of the methods, in some embodiments, multiple existing indicators (e.g. time from reset, amount of data read and written, number of read and write commands received, inter-command gap, previously stored command activity) may be used in concert. It is conceivable that a mass storage device, such as data storage device 50, could be used in a simple or primitive system that does not use the aforementioned commands, and in such a case, the other indicators could provide an alternate mechanism to make a less confident, but still useful estimation of boot progress, and thus cache desirability.

In some embodiments, the transition triggers described above have been observed in a Windows Operating System by Microsoft Corporation boot trace. However, boot transition detection can apply to other full-featured operating systems (e.g. Linux, Apple OS X, UNIX) as well. The multiple trigger evaluation scheme mentioned above may increase the reliability of detecting boot transition.

Referring now to FIG. 3, a flow diagram is shown illustrating an exemplary process and a transition in caching modes in accordance with an embodiment. In particular, during boot up (especially during the operating system load on host 56), the data storage device 50 employs more aggressive caching to give preferential treatment to boot commands. In some embodiments, the aggressive caching may comprise boot commands evicting, if necessary, non-boot commands from the cache. Alternatively, the aggressive caching may comprise allocating more cache space for boot commands (as shown in FIG. 3).

As shown in FIG. 3, the cache for boot commands and operational commands is conceptually shown. During boot, the cache may store boot commands as they are issued, which is illustrated as an arrow showing the boot commands growing downward into the unused portion of the cache. During aggressive caching for boot commands, boot commands are given priority, and if needed, may evict operation commands from the cache. As shown, by the time that the boot transition has passed, the boot commands portion of the cache has grown (as indicated by the arrow and growth into the unused portion, which is now smaller). In addition, the operational commands portion of the cache may now grow (as indicated by the upward pointing arrow) as more normal operations of the host 56 may commence as boot ends. In other words, the portions of the cache for boot commands and operational commands may "grow" in different directions toward each other by consuming unused space. However, of note, during normal caching mode, operational commands may now evict boot commands as needed, e.g., if the two cache portions begin to overlap.

Upon detecting a boot transition, the data storage device 50 may then modify it's caching policy to suit normal operations. For example, the data storage device 50 may provide more space in a command cache in SM 38 for operation commands.

FIG. 4 illustrates a flow diagram illustrating an exemplary process for detecting a boot transition based on identifying a boot command in accordance with an embodiment. In particular, in one embodiment, the control circuitry 32 has been configured to detect a boot transition based on identifying an ATA Security Freeze Lock command. Of note, the use of a Security Freeze Lock command may also have been derived by the control circuitry 32 based on an analysis of the previous boot history.

Of note, the control circuitry 32 may be configured to detect a boot transition based on multiple occurrences of a trigger. For example, in one variation of the Windows operating system, the Security Freeze Lock has been observed to occur twice, i.e., early in the operating system load and then just before normal operations. In some embodiments, therefore, the control circuitry 32 may be configured to recognize this second (or later) occurrence of a command as indicating a boot transition.

FIG. 5 illustrates a flow diagram illustrating an exemplary process for detecting a boot transition based on identifying a boot command or a command queue depth (CQD) in accordance with an embodiment. In particular, as shown, the control circuitry 32 may utilize multiple triggers, alone or in combination, to indicate a boot transition. For example, as shown, the ATA Disable Revert command and a command queue depth (CQD) have been configured as triggers for detecting a boot transition. In some embodiments, a CQD>1 may be utilized as a trigger.

FIG. 6 illustrates a flow diagram illustrating an exemplary process for boot transition based on identifying a plurality of triggers in accordance with an embodiment. As shown, the control circuitry 32 may be configured with a plurality of triggers and then count these occurrence until a threshold, m, has been met or exceeded. For example, as noted above, the Security Freeze Lock command may occur multiple times during an operating system load. In addition, this policy may be useful when the history recorded by the data storage device 50 indicates that a finite set of commands frequently occur during boot transition. However, the specific order that these commands occur may vary between different boot sequences. Accordingly, the control circuitry 32 may utilize this counting approach.

FIG. 7 illustrates a flow diagram illustrating an exemplary process for boot transition based on identifying a trigger and then passage of a certain time delay in accordance with an embodiment. As shown, the control circuitry 32 may utilize a specific trigger or combination of triggers as indicated the beginning of the boot transition. In response, a timer may be employed to allow any commands that occurs soon after the triggers to be cached aggressively.

The specific triggers and length of time used by the control circuitry 32 may be determined by a setting or dynamically adjusted, for example, based on the boot history logs recorded by the data storage device.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method for operating a mass storage device, said method comprising:

detecting power-up of a host device connected to a mass storage device over a communications interface;

providing boot code to the host device over the communications interface in response to said detecting the power-up;

setting a cache of the mass storage device to a boot caching mode;

receiving, by the mass storage device, data storage access commands from the host device;

monitoring a command queue configured to buffer the data storage access commands;

determining that a depth of the command queue has increased to a value greater than one;

determining a transition from a boot process to normal operations by the host device based at least in part on the increase of the command queue depth; and setting the cache of the mass storage device to an operational mode based on the transition.

2. The method of claim 1, wherein said determining the transition is further based at least in part on detecting an ATA security freeze lock command from the host device.

3. The method of claim 1, wherein said determining the transition is further based at least in part on detecting an ATA set features command from the host device.

4. The method of claim 1, wherein said determining the transition is further based at least in part on a determination that the depth of the command queue has reached a threshold value.

5. The method of claim 1, wherein said determining the transition is further based at least in part on detecting receipt of a sequence of data storage access commands from the host device that are associated with a boot transition.

6. The method of claim 1, wherein said determining the transition is further based at least in part on detecting receipt of a plurality of commands from a predetermined set of commands from the host device that are associated with a transition to normal operations by the host device.

7. The method of claim 1, wherein said determining the transition is further based at least in part on detecting expiration of a timer.

8. The method of claim 1, wherein said determining the transition is further based at least in part on detecting an ATA cache flush command from the host device.

9. A mass storage device comprising:
- a non-volatile data storage medium comprising boot code for boot up of a host device;
- a cache configured for a boot mode and an operational mode;
- a command queue;
- an interface configured for communications with the host device; and
- a controller configured to:
  - power up the mass storage device;
  - set the cache to the boot mode;
  - receive data storage access commands from the host device over the interface;
  - buffer the data storage access commands in the command queue;
  - determine that a depth of the command queue has increased to a value greater than one;
  - determine a transition from a boot sequence to normal operations by the host based at least in part on the increase of the command queue depth; and
  - set the cache to the operational mode based on the transition.

10. The mass storage device of claim 9, wherein the controller is further configured to determine the transition at least in part by detecting a security freeze lock command from the host device.

11. The mass storage device of claim 9, wherein the controller is further configured to determine the transition at least in part by detecting a set features command from the host device.

12. The mass storage device of claim 9, wherein the controller is further configured to determine the transition at least in part by determining when the command queue depth reaches a threshold value.

13. The mass storage device of claim 9, wherein the controller is further configured to determine the transition at least in part by detecting a sequence of commands from the host device that historical boot data maintained by the mass storage device indicates are associated with a boot transition.

14. The mass storage device of claim 9, wherein the controller is further configured to determine the transition at least in part by detecting a set of commands from the host device that historical boot data indicates are associated with a boot transition.

15. The mass storage device of claim 9, wherein the controller is further configured to determine the transition at least in part by detecting expiration of a timer.

16. A method of booting up a host coupled to a mass storage device, wherein the mass storage device comprises a cache that is configurable in an operational mode and a boot mode, said method comprising:
by a host coupled to a mass storage device:
- sending a request to the mass storage device for powering up the mass storage device;
- receiving boot code from the mass storage device;
- setting a cache of the mass storage device to a boot mode;
- providing data storage access commands to the mass storage device; and
- upon transition from a boot process to normal operations by the host, receiving data from the mass storage device associated with an operational mode of the cache of the mass storage device;
- wherein the mass storage device is configured to buffer the data storage access commands in a command queue and determine the transition based at least in part on an increase of a depth of the command queue to a value greater than one.

17. The method of claim 16, wherein one or more of the data storage access commands indicates the transition from the boot process to normal operations by the host.

18. The method of claim 17, wherein the one or more of the data storage access commands comprises a security freeze lock command.

19. The method of claim 17, wherein the one or more of the data storage access commands comprises a set features command.

20. The method of claim 17, wherein the one or more of the data storage access commands comprises a predetermined sequence of commands.

21. The method of claim 17, wherein the one or more of the data storage access commands comprises a plurality of commands from a predetermined set of commands.

22. A mass storage device comprising:
- a non-volatile data storage medium comprising boot code for boot up of a host device;
- a cache configured for a boot mode and an operational mode;
- an interface configured for communications with the host device; and
- a controller configured to:
  - detect power-up of the host device;

provide the boot code to the host device over the interface in response to said detecting the power-up;
set the cache to the boot mode;
receive data storage access commands from the host device;
monitor a command queue configured to buffer the data storage access commands from the host;
determine that a depth of the command queue has increased to a value greater than one;
determine that the host device has transitioned from a boot process to normal operations based at least in part on the increase of the command queue depth; and
set the cache of the mass storage device to the operational mode based on the transition of the host device to normal operations.

* * * * *